United States Patent
Wang et al.

(10) Patent No.: US 11,341,055 B2
(45) Date of Patent: May 24, 2022

(54) METHOD, ELECTRONIC DEVICE, AND COMPUTER PROGRAM PRODUCT FOR STORAGE MANAGEMENT

(71) Applicant: EMC IP Holding Company LLC, Hopkinton, MA (US)

(72) Inventors: Cheng Wang, Beijing (CN); Bing Liu, Tianjin (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 23 days.

(21) Appl. No.: 16/915,440

(22) Filed: Jun. 29, 2020

(65) Prior Publication Data
US 2021/0374048 A1    Dec. 2, 2021

(30) Foreign Application Priority Data
May 29, 2020    (CN) .......................... 202010476875.4

(51) Int. Cl.
*G06F 12/0871* (2016.01)
*G06F 12/02* (2006.01)
*G06F 12/0875* (2016.01)

(52) U.S. Cl.
CPC ...... *G06F 12/0871* (2013.01); *G06F 12/0223* (2013.01); *G06F 12/0875* (2013.01); *G06F 2212/1041* (2013.01); *G06F 2212/604* (2013.01)

(58) Field of Classification Search
None
See application file for complete search history.

(56) References Cited

U.S. PATENT DOCUMENTS

| 9,223,713 | B2* | 12/2015 | Pan ..................... G06F 12/0873 |
| 9,846,655 | B1* | 12/2017 | Zhao ...................... G06F 3/061 |
| 2015/0039837 | A1* | 2/2015 | Quan ...................... G06F 3/061 711/136 |
| 2018/0239714 | A1* | 8/2018 | Abhishek Raja ... G06F 12/1027 |

* cited by examiner

*Primary Examiner* — Charles J Choi
(74) *Attorney, Agent, or Firm* — Womble Bond Dickinson (US) LLP

(57) ABSTRACT

Embodiments of the present disclosure relate to a method, an electronic device, and a computer program product for storage management. According to an example implementation of the present disclosure, a method for storage management includes: determining a state of cached data stored in an initial cache space of a storage system including a plurality of cache disks, the state indicating that a size of the cached data does not match a size of the initial cache space; determining, based on the state, a target cache space of the storage system; and storing at least a part of the cached data into the target cache space to change the size of the initial cache space. Therefore, the management performance can be improved, and the storage costs can be reduced.

14 Claims, 7 Drawing Sheets

METHOD, ELECTRONIC DEVICE, AND COMPUTER PROGRAM PRODUCT FOR STORAGE MANAGEMENT

CROSS-REFERENCE TO RELATED APPLICATION

This patent application claims priority, under 35 U.S.C. § 119, of Chinese Patent Application No. 202010476875.4, filed May 29, 2020, which is incorporated by reference in its entirety.

TECHNICAL FIELD

Embodiments of the present disclosure generally relate to storage management, and in particular, to a method, an electronic device, and a computer program product for storage management.

BACKGROUND

A deduplication storage system used to provide data protection can be used as a target storage in a backup solution. At present, such a storage system can be deployed in a cloud or an on-premise virtualized environment, and use a solid state drive (SSD) as a cache space of cached data (e.g., metadata and/or hot data) to improve performance. Compared with a traditional hard disk drive (HDD), a solid state drive has higher performance, but results in higher costs.

SUMMARY OF THE INVENTION

A method, an electronic device, and a computer program product for storage management are provided in the embodiments of the present disclosure.

In a first aspect of the present disclosure, a method for storage management is provided. The method includes: determining a state of cached data stored in an initial cache space of a storage system comprising a plurality of cache disks, the state indicating that a size of the cached data does not match a size of the initial cache space; determining, based on the state, a target cache space of the storage system; and storing at least a part of the cached data into the target cache space to change the size of the initial cache space.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: determining a state of cached data stored in an initial cache space of a storage system comprising a plurality of cache disks, the state indicating that a size of the cached data does not match a size of the initial cache space; determining, based on the state, a target cache space of the storage system; and storing at least a part of the cached data into the target cache space to change the size of the initial cache space.

In a third aspect of the present disclosure, a computer program product is provided. The computer program product is tangibly stored on a non-transitory computer readable medium and includes a machine-executable instruction; and the machine-executable instruction, when executed, causes a machine to perform any steps of the method according to the first aspect of the present disclosure.

The summary is provided to introduce the selection of concepts in a simplified form, which will be further described in the Detailed Description below. The Summary part is neither intended to identify key features or necessary features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, identical or corresponding reference numerals represent identical or corresponding parts.

DETAILED DESCRIPTION

Figure 1:
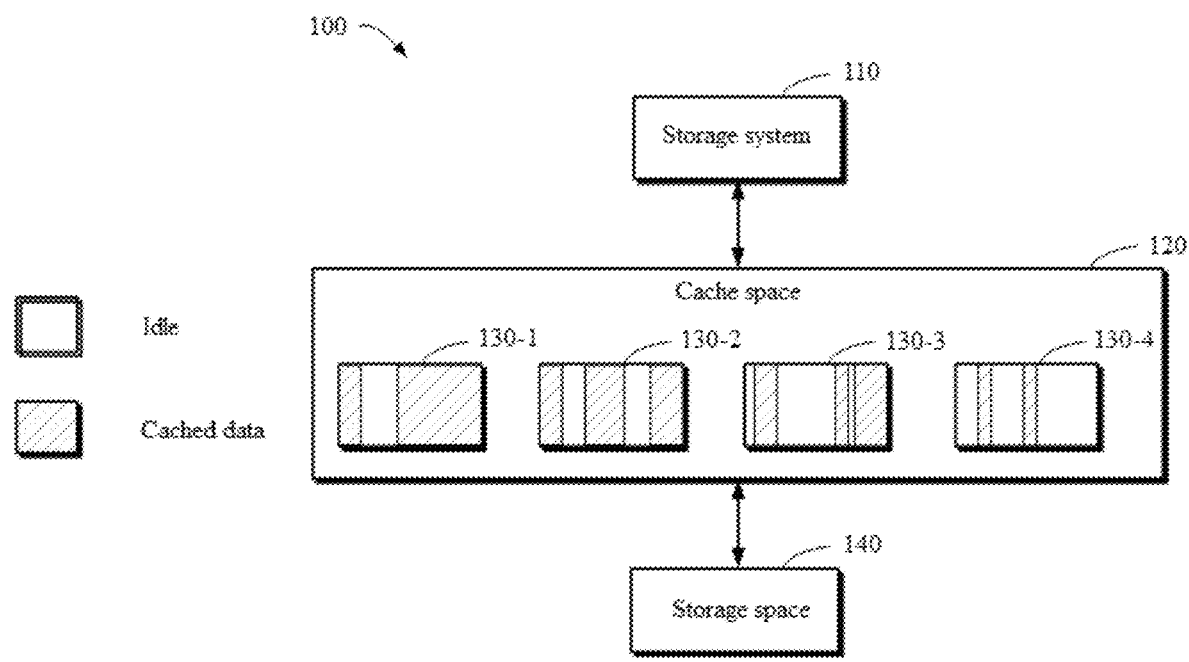
FIG. 1 shows a schematic diagram of an example of a storage management environment in which some embodiments of the present disclosure can be implemented.

Preferred embodiments of the present disclosure will be described in more detail below with reference to the accompanying drawings. Although preferred embodiments of the present disclosure are shown in the accompanying drawings, it should be understood that the present disclosure can be implemented in various forms and should not be limited to the embodiments set forth herein. Rather, these embodiments are provided to make the present disclosure more thorough and complete, and can fully convey the scope of the present disclosure to those skilled in the art.

The term "include" and variants thereof used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, compared with a hard disk drive, a solid state drive has higher performance, but results in higher costs. How to efficiently use a solid state drive is the key to improving a storage system. Traditionally, after a storage system is deployed in a cloud or an on-premise virtualized environment, the cache space of the storage system is usually not set to the maximum capacity at one time. The size of the cache space depends on the size of backup data stored in the storage space of the storage system. In fact, the cache space is gradually allocated as the backup data increases, attached to the storage system, and managed by the file system for caching cached data such as metadata and/or hot data. This approach conforms to the principle of a pay-as-you-go consumption model.

However, after the backup data is deleted, the corresponding cached data thereof will also be marked or deleted in the file system. After several rounds of garbage recycling, the cached data will be fragmented and scattered in the cache space. For example, in a user scenario, in an initial stage, the backup data of a user reaches 100% capacity of the storage space, and the user is allocated with 100% capacity of the cache space accordingly. Over time, the backup data of the user is decreased by 50% due to deduplication and other reasons. However, the storage system will continue to use 100% of the cache space, although 50% of the cache space is no longer used to store cached data. In this case, resources are wasted and users have to pay extra charges for the unused 50% of the cache space.

According to an example embodiment of the present disclosure, an improved solution for storage management is proposed. The solution comprises determining a state of cached data stored in an initial cache space of a storage system comprising a plurality of cache disks, the state indicating that a size of the cached data does not match a size of the initial cache space; determining, based on the state, a target cache space of the storage system; and storing at least a part of the cached data into the target cache space to change the size of the initial cache space.

In this way, this solution can reduce the use of unnecessary cache space without affecting the performance of the storage system. In addition, this solution can also provide more cache space to accelerate access to cached data such as metadata and hot data.

In the following, specific examples of this solution will be described in more detail with reference to FIG. 1 to FIG. 7. FIG. 1 shows a schematic diagram of an example of storage management environment 100 according to some embodiments of the present disclosure. Storage management environment 100 includes storage system 110, initial cache space 120, and storage space 140. Storage system 110 may be a deduplication storage system used to provide data protection. Storage system 110 may be an instance of a virtual device or a physical device.

Storage system 110 has a corresponding initial cache space 120 and storage space 140. Storage space 140 may be used to store backup data. Initial cache space 120 may include a plurality of cache disks, such as cache disks 130-1 to 130-4 (hereinafter, collectively referred to as "cache disk 130"). Cache disk 130 may be implemented by a device with a high access speed, such as a solid state drive. Alternatively, cache disk 130 may be implemented by any device with storage capabilities, such as any magnetic storage device or optical storage device. It should be understood that although four cache disks are shown in FIG. 1, the number of cache disks is not limited to this and may be any suitable larger or smaller number.

Cache disk 130 may be used to store cached data. For example, the cached data may be metadata of the backup data and/or hot data in the backup data. The metadata may indicate attributes of the backup data; for example, the metadata may indicate an index used to access the backup data, an identifier of the backup data, and so on. The hot data may be frequently accessed data in the backup data or recently accessed data.

Over time, the size of the cached data and the size of initial cache space 120 may become mismatched. For example, after the backup data in storage space 140 is deleted, the corresponding metadata thereof will also be marked or deleted in the file system. In addition, the original hot data may also no longer be accessed frequently, and thus will also be deleted from initial cache space 120. After several rounds of garbage recycling, the cached data will be fragmented and scattered in cache disk 130 of initial cache space 120. As shown in FIG. 1, in cache disk 130, the cached data is not continuously stored, so that the cached data is interwoven with the free space. In this case, the size of the cached data may be much smaller than the size of initial cache space 120.

As another example, as the backup data increases, the corresponding metadata thereof also increases, or the hot data may also increase with the backup data. In addition, more backup data may also need to be moved into the cache space to become hot data due to frequent access. In this case, the size of initial cache space 120 may no longer meet the storage requirements for the cached data. To this end, storage system 110 may manage initial cache space 120 to change the size of the initial cache space so that the size of the cached data matches the size of the cache space.

Figure 2:
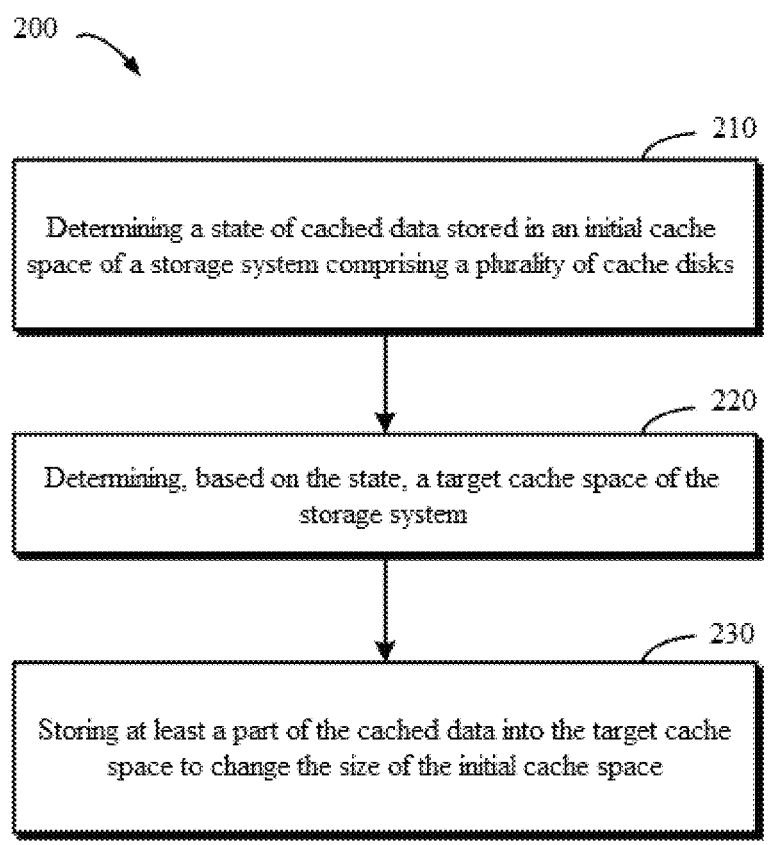
FIG. 2 shows a flowchart of a method for storage management according to some embodiments of the present disclosure.

The operations performed by storage system 110 will be described in detail below with reference to FIG. 2 to FIG. 5. FIG. 2 shows a flowchart of method 200 for storage management according to some embodiments of the present disclosure. For example, method 200 may be performed by storage system 110 as shown in FIG. 1. It should be understood that method 200 may also include additional steps not shown and/or may skip the steps shown, and that the scope of the present disclosure is not limited in this respect. For ease of understanding, method 200 will be described with reference to FIG. 3 to FIG. 5.

At 210, storage system 110 determines a state of cached data stored in initial cache space 120 of storage system 110 that includes a plurality of cache disks 130. The state may indicate that the size of the cached data and the size of initial cache space 120 do not match. For example, for metadata, the state may be the size of the metadata. For hot data, the state may be an access pattern of the hot data. For example, the access pattern may be an access frequency of the hot data over a period of time.

At 220, storage system 110 determines a target cache space of storage system 110 based on the state. In some embodiments, the target cache space may be smaller than initial cache space 130. For example, some of the plurality of cache disks 130 in initial cache space 120 may be retained to form the target cache space. Alternatively, the target cache space may be larger than initial cache space 130. For example, a new cache disk may be added to initial cache space 130 to form the target cache space. At 230, storage system 110 stores at least a part of the cached data into the target cache space to change the size of initial cache space 130.

In this way, this solution can, on the one hand, reduce the use of unnecessary cache space without affecting the performance of the storage system. On the other hand, more cache space may be provided to accelerate access to cached data such as metadata and hot data.

Since the cached data is typically divided into metadata and hot data, in the following, storage management of the metadata will be described in detail with reference to FIG. 3 to FIG. 4, and storage management of the hot data will be described in detail with reference to FIG. 5.

Figure 3:
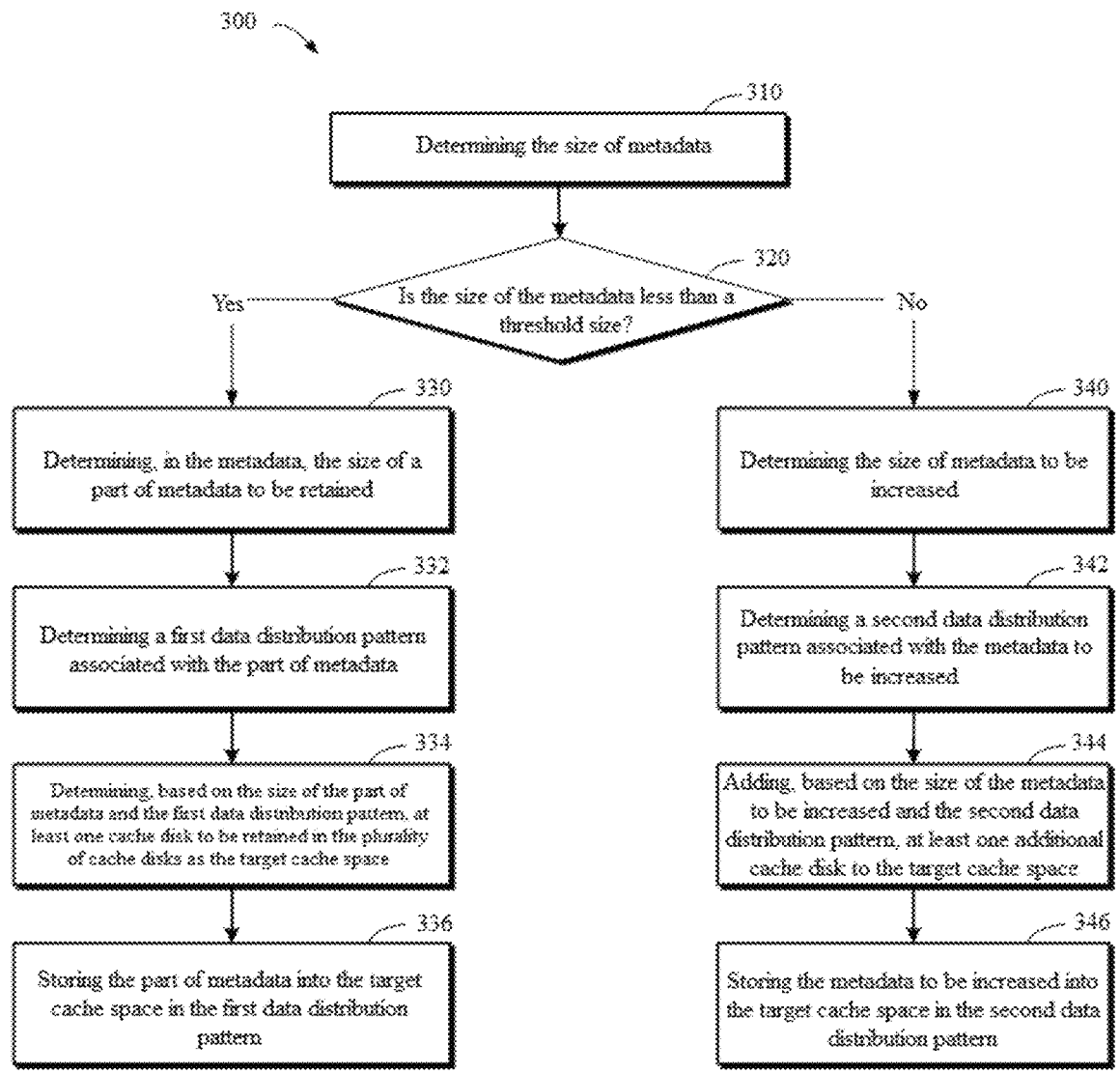
FIG. 3 shows a flowchart of a method for storage management of metadata according to some embodiments of the present disclosure.

FIG. 3 shows a flowchart of method 300 for storage management of metadata according to some embodiments of the present disclosure. At 310, storage system 110 may determine the size of metadata. At 320, storage system 110 may determine whether the size of the metadata is smaller than a predetermined threshold size. For example, if the size of the pre-allocated cache space for storing metadata is 5 TB, as the backup data increases, the actual metadata gradually increases from 0 to a threshold size of 5 TB (e.g., 80%), which means that the cache space needs to be increased. Accordingly, if the pre-allocated 5 TB of cache space was once fully occupied, the backup data has decreased continuously, and the actual metadata has decreased to a threshold size of 5 TB (e.g., 60%), which means that the cache space needs to be reduced. It should be understood that although collectively referred to as threshold size, the threshold size for an increased cache space is usually different from the threshold size for a decreased cache space.

In some embodiments, a user may choose whether to manually control the change of the size of initial cache space 130. If the size of the metadata exceeds the threshold size, that is, no matter whether it is smaller than or larger than the threshold size, storage system 110 may determine the disk configuration for initial cache space 130. The disk configuration may indicate whether the user manually controls the change of the size of initial cache space 130.

If the disk configuration indicates that the user manually controls the change of the size of initial cache space 130, storage system 110 may send a request message to the user indicating that the size of the initial cache space needs to be changed and an expected duration required to change the size. If an indication is received from the user that allows to change the size of the initial cache space, storage system 110 may determine the target cache space. Rather, if the disk configuration indicates that the change of the size of initial cache space 130 is implemented automatically, storage system 110 may directly automatically determine the target cache space.

On the one hand, in the case where the size of the metadata is smaller than the threshold size, at 330, storage system 110 may determine, in the metadata, the size of a part of metadata to be retained. For example, since some backup data in storage space 140 has been deleted compared with the initial stage, the corresponding metadata thereof will not be retained. For this reason, the size of the part of metadata to be retained may be determined in the metadata.

In addition, at 332, storage system 110 may also determine a data distribution pattern associated with the part of metadata (hereinafter, referred to as the "first data distribution pattern"). The first data distribution pattern may indicate the manner in which the part of metadata will be stored in the target cache space. The first data distribution pattern may indicate any suitable storage manner. For example, the first data distribution pattern may indicate that a part of metadata will be evenly stored in the target cache space. Alternatively, the first data distribution pattern may also indicate that the metadata is sequentially stored according to the size of the cache disks, or sequentially stored according to the serial numbers of the cache disks. Further, the metadata may be distributed on multiple metadata disks per specific workload patterns.

Therefore, at 334, storage system 110 may determine, based on the size of the part of metadata and the first data distribution pattern, at least one cache disk to be retained in the plurality of cache disks as the target cache space. For example, storage system 110 may determine how many cache disks or which cache disks may be sufficient to store the part of metadata in a manner specified by the first data distribution pattern. Then, at 336, storage system 110 may store the part of metadata into the target cache space in the first data distribution pattern.

In addition, in some embodiments, storage system 110 may also generate a delete request to delete from the file system a cache disk that is not retained. Further, storage system 110 may also separate a cache disk from storage system 110 and deallocate a cache disk from the cloud or the on-premise virtualized environment to save storage resources.

Figure 4:
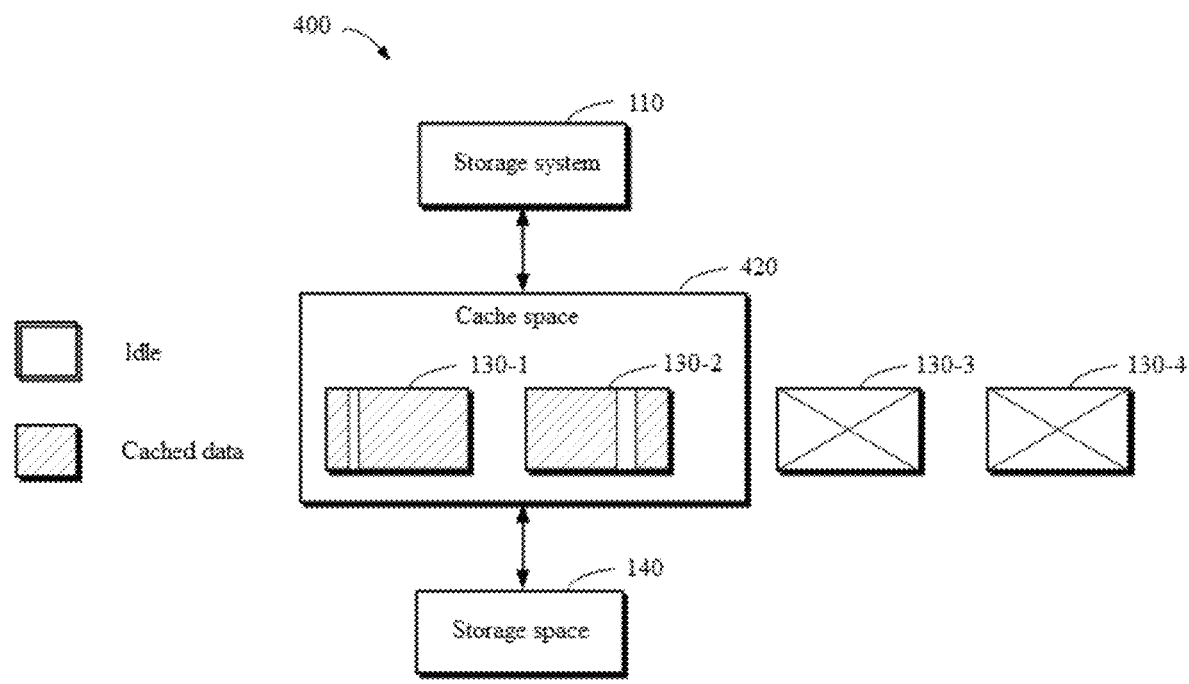
FIG. 4 shows a schematic diagram of an example of a storage management system after storage management is performed for the metadata according to some embodiments of the present disclosure.
Figure 5:
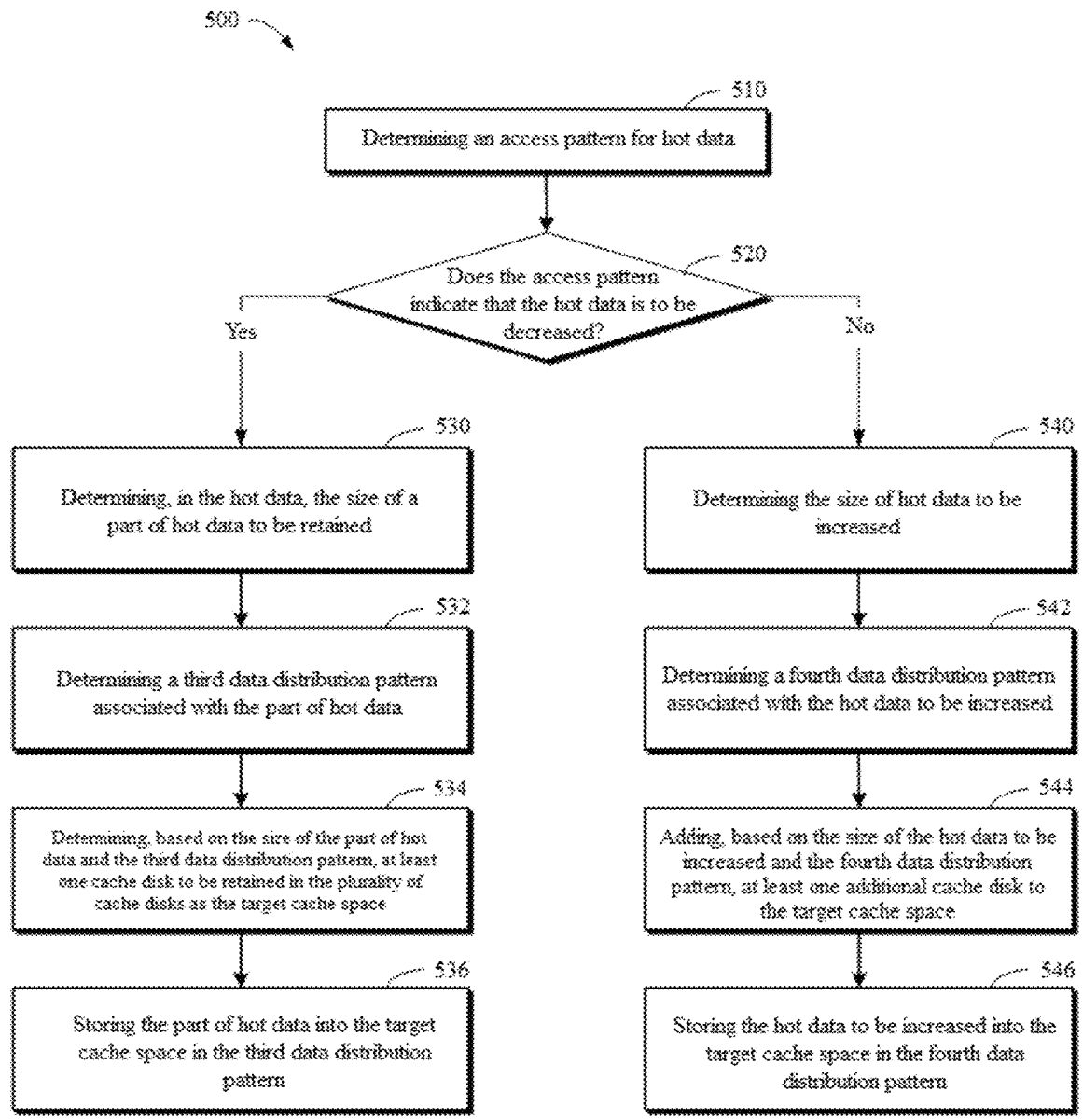
FIG. 5 shows a flowchart of a method for storage management of hot data according to some embodiments of the present disclosure.

FIG. 4 shows a schematic diagram of an example of storage management environment 400 after storage management is performed for the metadata according to some embodiments of the present disclosure. As shown in FIG. 4, storage system 110 determines to retain cache disks 130-1 and 130-2 as target cache space 420, and store into cache disks 130-1 and 130-2 a part of metadata to be retained. In addition, cache disks 130-3 and 130-4 that were originally in initial cache space 120 are deleted from the file system, separated from storage system 110, and deallocated from the cloud or the on-premise virtualized environment.

Referring back to FIG. 3, on the other hand, in the case where the size of the metadata is larger than the threshold size, at 340, storage system 110 may determine the size of metadata to be increased. For example, since new backup data is increased in storage space 140 compared with the initial stage, the corresponding metadata thereof will also increase accordingly. In addition, it should be understood that in the text, the metadata to be increased includes at least a part of the original metadata and the newly increased metadata.

At 342, storage system 110 may determine a data distribution pattern associated with the metadata to be increased (hereinafter, referred to as the "second data distribution pattern"). Similar to the first data distribution pattern, the second data distribution pattern indicates the manner in which the metadata to be increased will be stored in the target cache space.

At 344, storage system 110 may add, based on the size of the metadata to be increased and the second data distribution pattern, at least one additional cache disk to the target cache space. For example, storage system 110 may determine how many cache disks need to be increased to be sufficient for storing a part of metadata in a manner specified by the second data distribution pattern, so that the needed cache disks may be added to the target cache space. At 346, storage system 110 may store the metadata to be increased into the target cache space in the second data distribution pattern.

The storage management for metadata is described above, and the storage management for hot data will be described below. FIG. 5 shows a flowchart of method 500 for storage management of hot data according to some embodiments of the present disclosure.

At 510, storage system 110 may determine an access pattern for hot data. At 520, storage system 110 may determine whether the access pattern indicates that the hot data needs to be updated. For example, the access pattern may be an access frequency of the hot data over a period of time. If the access pattern indicates that the recent access frequency of some hot data is relatively low, in this case, the access pattern reflects that the hot data needs to be decreased, and therefore no longer requires a large cache space. If the access pattern indicates that the recent access frequency of a large amount of hot data is relatively high, in this case, the access pattern reflects that the hot data needs to be increased, and therefore requires a larger cache space. As another example, in addition to the access pattern, the size of the backup data may also indicate whether the hot data needs to be updated. This is because, in some embodiments, the size of the hot data may depend on the size of the backup data. When the size of the backup data changes, the size of the hot data will change accordingly, so that the size of the backup data may also reflect that the hot data needs to be updated.

On the one hand, in the case where the access pattern indicates that the hot data is to be decreased, at 530, storage system 110 may determine, in the hot data, the size of a part of hot data to be retained. For example, the part of hot data to be retained is the hot data whose access frequency is higher than a predetermined threshold frequency over a period of time. At 532, storage system 110 may determine a data distribution pattern associated with the part of hot data (hereinafter, referred to as the "third data distribution pattern"). Similar to the first data distribution pattern and the second data distribution pattern, the third data distribution pattern indicates the manner in which the part of hot data will be stored in the target cache space.

At 534, storage system 110 may determine, based on the size of the part of hot data and the third data distribution pattern, at least one cache disk to be retained in the plurality of cache disks as the target cache space. For example, storage system 110 may determine how many cache disks or which cache disks may be sufficient to store the size of the part of hot data in a manner specified by the third data distribution pattern. At 536, storage system 110 may store the part of hot data into the target cache space in the third data distribution pattern.

In addition, similar to the processing of an unretained cache disk for storing metadata, storage system 110 may also generate a delete request to delete from the file system an unretained cache disk for storing hot data. Further, storage system 110 may also separate a cache disk from storage system 110 and deallocate a cache disk from the cloud or the on-premise virtualized environment to save storage resources.

On the other hand, in the case where the access pattern indicates that the hot data is to be increased, at 540, storage system 110 may determine the size of hot data to be increased. For example, compared with the initial stage, the recent access frequency of a large amount of hot data is relatively high, which implies that more backup data needs to be moved from the storage space to the cache space as hot data. In addition, it should be understood that in the text, the hot data to be increased includes at least a part of the original hot data and the newly increased hot data.

At 542, storage system 110 may determine a data distribution pattern associated with the hot data to be increased (hereinafter, referred to as the "fourth data distribution pattern"). Similar to the third data distribution pattern, the fourth data distribution pattern indicates the manner in which the hot data to be increased will be stored in the target cache space.

At 544, storage system 110 may add, based on the size of the hot data to be increased and the fourth data distribution pattern, at least one additional cache disk to the target cache space. For example, storage system 110 may determine how many cache disks need to be increased to be sufficient for storing the part of hot data in a manner specified by the fourth data distribution pattern, so that the needed cache disks may be added to the target cache space. At 546, storage system 110 may store the hot data to be increased into the target cache space in the fourth data distribution pattern.

In this way, this solution can, on the one hand, reduce the use of unnecessary cache space without affecting the performance of the storage system. On the other hand, more cache space may be provided to accelerate access to cached data such as metadata and hot data.

Figure 6:
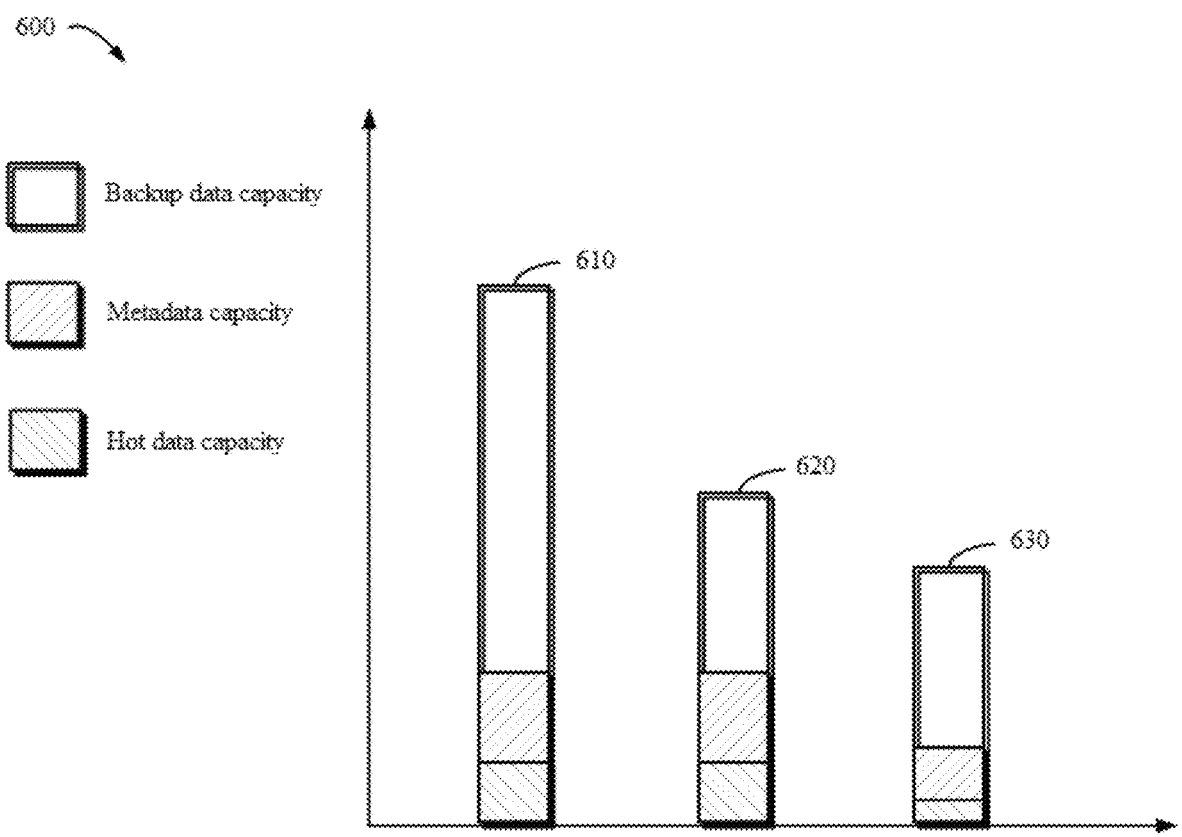
FIG. 6 shows a schematic diagram of an example of comparison between traditional storage management and storage management according to some embodiments of the present disclosure.

FIG. 6 shows a schematic diagram of example 600 of comparison between traditional storage management and storage management according to some embodiments of the present disclosure. Histogram 610 shows that, in the initial stage, backup data of a user reaches 100% capacity of the storage space, and the user is allocated with 100% capacity of the cache space accordingly to store cached data such as metadata and hot data. Histogram 620 shows that, after a period of use, the backup data of the user is decreased by 50% due to deduplication and other reasons. However, the storage system will continue to use 100% of the cache space, although 50% of the cache space is no longer used to store cached data. In this case, resources are wasted and users have to pay extra charges for the unused 50% of the cache space. Histogram 630 shows that, after a period of use, the storage system will no longer use the unused 50% of the cache space due to application of the storage management of the solution, so that no extra charge is required.

Figure 7:
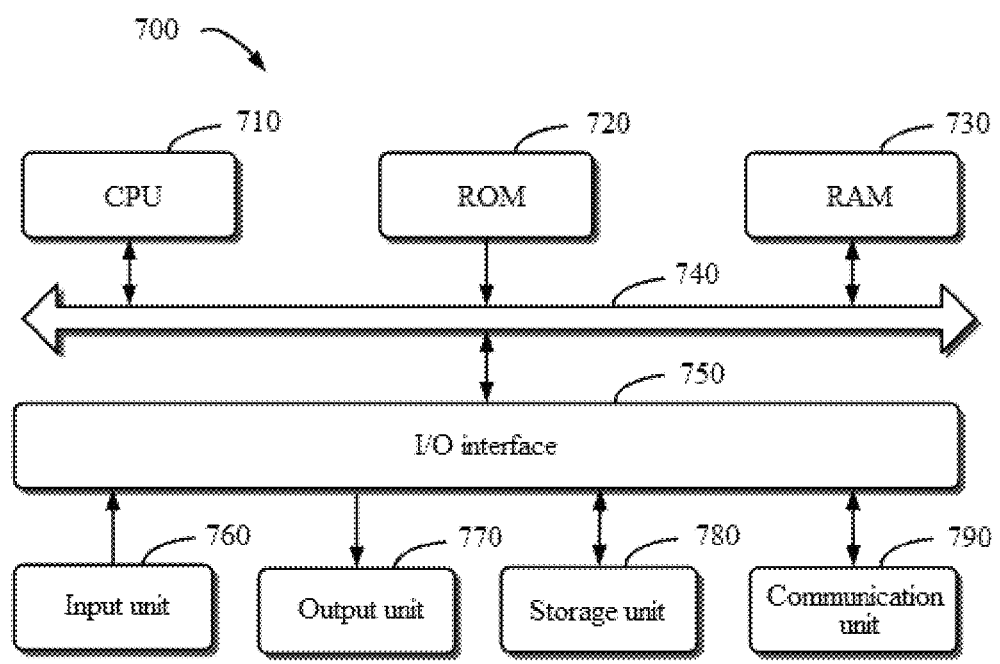
FIG. 7 shows a schematic block diagram of an example device that can be used to implement an embodiment of the present disclosure.

FIG. 7 is a schematic block diagram of example device 700 that can be configured to implement an embodiment of the present disclosure. For example, storage system 110 as shown in FIG. 1 may be implemented by device 700. As shown in the figure, device 700 includes central processing unit (CPU) 710 that may perform various appropriate actions and processing according to computer program instructions stored in read-only memory (ROM) 720 or computer program instructions loaded from storage unit 780 to random access memory (RAM) 730. Various programs and data required for operations of device 700 may also be stored in RAM 730. CPU 710, ROM 720, and RAM 730 are connected to each other through bus 740. Input/output (I/O) interface 750 is also connected to bus 740.

A plurality of components in device 700 are coupled to I/O interface 750, including: input unit 760, such as a keyboard and a mouse; output unit 770, such as various types of displays and speakers; storage unit 780, such as a magnetic disk and an optical disc; and communication unit 790, such as a network card, a modem, and a wireless communication transceiver. Communication unit 790 allows device 700 to exchange information/data with other devices over a computer network such as the Internet and/or various telecommunication networks.

The various processes and processing described above, such as method 200, method 300, and method 500, may be performed by processing unit 710. For example, in some embodiments, method 200, method 300, and method 500 may be implemented as a computer software program that is tangibly included in a machine-readable medium such as storage unit 780. In some embodiments, part or all of the computer program may be loaded and/or installed onto device 700 via ROM 720 and/or communication unit 790. When the computer program is loaded into RAM 730 and executed by CPU 710, one or more actions of method 200, method 300, and method 500 described above can be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet provided by an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flow charts and/or block diagrams.

The flowcharts and block diagrams in the accompanying drawings illustrate the architectures, functions, and operations of possible implementations of the systems, methods, and computer program products according to multiple embodiments of the present disclosure. In this regard, each block in the flowcharts or block diagrams may represent a module, a program segment, or a part of an instruction that includes one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

Various embodiments of the present disclosure have been described above. The foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for storage management, comprising:
determining a state of cached data stored in an initial cache space of a storage system comprising a plurality of cache disks, the state indicating that a size of the cached data does not match a size of the initial cache space, wherein the cached data is metadata indicating an attribute of backup data stored in a storage space of the storage system and determining the state comprises determining a size of the metadata;
determining, based on the state, a target cache space of the storage system; and
storing at least a part of the cached data into the target cache space to change the size of the initial cache space, wherein if the size of the metadata is smaller than a threshold size, determining the target cache space comprises:
determining, in the metadata, a size of a part of metadata to be retained;
determining a first data distribution pattern associated with the part of metadata, the first data distribution pattern indicating a manner in which the part of metadata will be stored in the target cache space; and
determining, based on the size of the part of metadata and the first data distribution pattern, at least one cache disk to be retained in the plurality of cache disks as the target cache space; and wherein if the size of the metadata is larger than the threshold size, determining the target cache space comprises:
determining a size of metadata to be increased;
determining a second data distribution pattern associated with the metadata to be increased, the second data distribution pattern indicating a manner in which the metadata to be increased will be stored in the target cache space; and
adding, based on the size of the metadata to be increased and the second data distribution pattern, at least one additional cache disk to the target cache space.

2. The method of claim 1, wherein
if the size of the metadata exceeds the threshold size, the method further comprises:
determining a disk configuration for the initial cache space, the disk configuration indicating whether a user manually controls a change of the size of the initial cache space;
if the disk configuration indicates that the user manually controls the change of the size of the initial cache space:
sending a request message to the user, the message indicating that the size of the initial cache space needs to be changed and an expected duration required to change the size, and
if an indication is received from the user that allows to change the size of the initial cache space, determining the target cache space.

3. The method of claim 1, wherein storing at least a part of the cached data into the target cache space comprises:
storing the part of metadata into the target cache space in the first data distribution pattern.

4. The method of claim 1, wherein storing at least a part of the cached data into the target cache space comprises:
storing the metadata to be increased into the target cache space in the second data distribution pattern.

5. A method for storage management, comprising:
determining a state of cached data stored in an initial cache space of a storage system comprising a plurality of cache disks, the state indicating that a size of the cached data does not match a size of the initial cache space, wherein the cached data is hot data whose access frequency exceeds a threshold frequency, and wherein determining the state comprises:
determining an access pattern for the hot data, the access pattern indicating whether the hot data needs to be updated;
determining, based on the state, a target cache space of the storage system; and
storing at least a part of the cached data into the target cache space to change the size of the initial cache space, wherein if the access pattern indicates that the hot data is to be decreased, determining the target cache space comprises:
determining, in the hot data, a size of a part of hot data to be retained;
determining a third data distribution pattern associated with the part of hot data, the third data distribution pattern indicating a manner in which the part of hot data will be stored in the target cache space; and
determining, based on the size of the part of hot data and the third data distribution pattern, at least one cache disk to be retained in the plurality of cache disks as the target cache space; and wherein if the access pattern indicates that the hot data is to be increased, determining the target cache space comprises:
determining a size of the hot data to be increased;
determining a fourth data distribution pattern associated with the hot data to be increased, the fourth data distribution pattern indicating a manner in which the hot data to be increased will be stored in the target cache space; and
adding, based on the size of the hot data to be increased and the fourth data distribution pattern, at least one additional cache disk to the target cache space.

6. The method of claim 5, wherein storing at least a part of the cached data into the target cache space comprises:
storing the part of hot data into the target cache space in the third data distribution pattern.

7. The method of claim 5, wherein storing at least a part of the cached data into the target cache space comprises:
storing the hot data to be increased into the target cache space in the fourth data distribution pattern.

8. An electronic device, comprising:
at least one processing unit; and
at least one memory coupled to the at least one processing unit and storing instructions configured to be executed by the at least one processing unit, wherein the instructions, when executed by the at least one processing unit, cause the device to perform actions comprising:
determining a state of cached data stored in an initial cache space of a storage system comprising a plurality of cache disks, the state indicating that a size of the cached data does not match a size of the initial cache space, wherein the cached data is metadata indicating an attribute of backup data stored in a storage space of the storage system and determining the state comprises determining a size of the metadata;
determining, based on the state, a target cache space of the storage system; and storing at least a part of the cached data into the target cache space to change the size of the initial cache space, wherein if the size of the metadata is smaller than a threshold size, determining the target cache space comprises:
determining, in the metadata, a size of a part of metadata to be retained;
determining a first data distribution pattern associated with the part of metadata, the first data distribution pattern indicating a manner in which the part of metadata will be stored in the target cache space; and
determining, based on the size of the part of metadata and the first data distribution pattern, at least one cache disk to be retained in the plurality of cache disks as the target cache space, and wherein if the size of the metadata is larger than the threshold size, determining the target cache space comprises:
determining a size of metadata to be increased;
determining a second data distribution pattern associated with the metadata to be increased, the second data distribution pattern indicating a manner in which the metadata to be increased will be stored in the target cache space; and
adding, based on the size of the metadata to be increased and the second data distribution pattern, at least one additional cache disk to the target cache space.

9. The device of claim 8, wherein
if the size of the metadata exceeds the threshold size, the method further comprises:
determining a disk configuration for the initial cache space, the disk configuration indicating whether a user manually controls a change of the size of the initial cache space;
if the disk configuration indicates that the user manually controls the change of the size of the initial cache space:
sending a request message to the user, the message indicating that the size of the initial cache space needs to be changed and an expected duration required to change the size, and
if an indication is received from the user that allows to change the size of the initial cache space, determining the target cache space.

10. The device of claim 8, wherein storing at least a part of the cached data into the target cache space comprises:
storing the part of metadata into the target cache space in the first data distribution pattern.

11. The device of claim 8, wherein storing at least a part of the cached data into the target cache space comprises:
storing the metadata to be increased into the target cache space in the second data distribution pattern.

12. A non-transitory machine-readable medium having instructions stored therein, which when executed by a processor, cause the processor to perform operations, the operations comprising:
determining a state of cached data stored in an initial cache space of a storage system comprising a plurality of cache disks, the state indicating that a size of the cached data does not match a size of the initial cache space, wherein the cached data is metadata indicating an attribute of backup data stored in a storage space of the storage system and determining the state comprises determining a size of the metadata;
determining, based on the state, a target cache space of the storage system; and
storing at least a part of the cached data into the target cache space to change the size of the initial cache space, wherein when the size of the metadata is smaller than a threshold size, determining the target cache space comprises:
determining, in the metadata, a size of a part of metadata to be retained;
determining a first data distribution pattern associated with the part of metadata, the first data distribution pattern indicating a manner in which the part of metadata will be stored in the target cache space; and
determining, based on the size of the part of metadata and the first data distribution pattern, at least one cache disk to be retained in the plurality of cache disks as the target cache space; and if the size of the metadata is larger than the threshold size, determining the target cache space comprises:
determining a size of metadata to be increased;
determining a second data distribution pattern associated with the metadata to be increased, the second data distribution pattern indicating a manner in which the metadata to be increased will be stored in the target cache space; and
adding, based on the size of the metadata to be increased and the second data distribution pattern, at least one additional cache disk to the target cache space.

13. A non-transitory machine-readable medium having instructions stored therein, which when executed by a processor, cause the processor to perform operations, the operations comprising:
determining a state of cached data stored in an initial cache space of a storage system comprising a plurality of cache disks, the state indicating that a size of the cached data does not match a size of the initial cache space, wherein the cached data is hot data whose access frequency exceeds a threshold frequency, and wherein determining the state comprises determining an access pattern for the hot data, the access pattern indicating whether the hot data needs to be updated;
determining, based on the state, a target cache space of the storage system; and
storing at least a part of the cached data into the target cache space to change the size of the initial cache space, wherein if the access pattern indicates that the hot data is to be decreased, determining the target cache space comprises:
determining, in the hot data, a size of a part of hot data to be retained;
determining a third data distribution pattern associated with the part of hot data, the third data distribution pattern indicating a manner in which the part of hot data will be stored in the target cache space; and
determining, based on the size of the part of hot data and the third data distribution pattern, at least one cache disk to be retained in the plurality of cache disks as the target cache space; and wherein if the access pattern indicates that the hot data is to be increased, determining the target cache space comprises:
determining a size of the hot data to be increased;
determining a fourth data distribution pattern associated with the hot data to be increased, the fourth data distribution pattern indicating a manner in which the hot data to be increased will be stored in the target cache space; and
adding, based on the size of the hot data to be increased and the fourth data distribution pattern, at least one additional cache disk to the target cache space.

14. An electronic device, comprising:
at least one processing unit; and
at least one memory coupled to the at least one processing unit and storing instructions configured to be executed by the at least one processing unit, wherein the instructions, when executed by the at least one processing unit, cause the device to perform actions comprising:
determining a state of cached data stored in an initial cache space of a storage system comprising a plurality of cache disks, the state indicating that a size of the cached data does not match a size of the initial cache space, wherein the cached data is hot data whose access frequency exceeds a threshold frequency, and wherein determining the state comprises:
determining an access pattern for the hot data, the access pattern indicating whether the hot data needs to be updated;
determining, based on the state, a target cache space of the storage system; and
storing at least a part of the cached data into the target cache space to change the size of the initial cache space, wherein if the access pattern indicates that the hot data is to be decreased, determining the target cache space comprises:
determining, in the hot data, a size of a part of hot data to be retained;
determining a third data distribution pattern associated with the part of hot data, the third data distribution pattern indicating a manner in which the part of hot data will be stored in the target cache space; and
determining, based on the size of the part of hot data and the third data distribution pattern, at least one cache disk to be retained in the plurality of cache disks as the target cache space; and wherein if the access pattern indicates that the hot data is to be increased, determining the target cache space comprises:
determining a size of the hot data to be increased;
determining a fourth data distribution pattern associated with the hot data to be increased, the fourth data distribution pattern indicating a manner in which the hot data to be increased will be stored in the target cache space; and
adding, based on the size of the hot data to be increased and the fourth data distribution pattern, at least one additional cache disk to the target cache space.

\* \* \* \* \*